Aug. 6, 1968  E. B. ESTERS  3,396,296

ELECTRIC MOTORS AND GENERATORS

Filed June 5, 1967

INVENTOR
ERNIE B. ESTERS

BY *Hauke, Krass, Gifford, & Patalidis*

ATTORNEYS

INVENTOR.
ERNIE B. ESTERS.

ATTORNEY.

Aug. 6, 1968  E. B. ESTERS  3,396,296
ELECTRIC MOTORS AND GENERATORS
Filed June 5, 1967  5 Sheets-Sheet 3

INVENTOR.
ERNIE B. ESTERS.
BY
ATTORNEYS

United States Patent Office 3,396,296
Patented Aug. 6, 1968

3,396,296
ELECTRIC MOTORS AND GENERATORS
Ernie B. Esters, 1456 Burlingame,
Detroit, Mich. 48206
Continuation-in-part of application Ser. No. 326,770,
Nov. 29, 1963. This application June 5, 1967, Ser.
No. 643,662
7 Claims. (Cl. 310—266)

ABSTRACT OF THE DISCLOSURE

Electric motors and generators having coaxial inner and outer stators each stator being provided preferably with magnetic flux producing permanent magnets. The rotor is disposed in the magnetic gap between the inner and outer stators and comprises radially disposed interconnected individual coils or longitudinally oriented core wound coils with appropriate pole pieces or, alternately, an S-skein continuous winding provided with magnetic flux channelling members.

Cross-reference to related application

The present application is a continuation-in-part of application Ser. No. 326,770, filed Nov. 29, 1963, and now abandoned.

Background of the invention

The invention relates to electric motors and generators and more particularly to motors and generators provided with a unique arrangement of coaxial concentric rotor and stators wherein a first stator is disposed inwardly of the rotor and a second stator is disposed outwardly of the rotor so as to achieve a high degree of efficiency.

Conventional electric motors and generators in use at the present time generally have an annular stator and a cylindrical rotor disposed internally of the stator. Electric currents applied to the rotor and/or rotor generate magnetic fields in the rotor and/or stator.

In electric motors these fields react with each other or other fields created by permanent magnets to produce forces of attraction and repulsion between the rotor and stator, and induce an EMF in generators. In such motor or generator arrangements, the attractive and repulsive forces and the induced EMF are created at the cylindrical interface between the rotor and stator.

Summary of the invention

The present invention has for a primary object to provide electric motors or generators having unique rotor-stator configurations whereby attractive and repulsive forces or induced EMF are generated at a plurality of interfaces provided between the rotor and the stators. In general, the unique configurations according to the present invention make use of an area of the magnetic field which is in existence in conventional rotor-stator configurations but which is not employed in that configuration to produce a motive force on the rotor or an induced EMF therein. For example, in one configuration of the present invention the rotor takes the form of a hollow cylinder supported for rotation between a first stator which is cylindrical in form and supported within the inner diameter of the rotor cylinder and a second cylindrical stator which surrounds the rotor. The present invention, consequently, provides for a more efficient use of the magnetic fields existing in an electric machine by providing a second stator with its own magnetic field for interacting with the rotor.

According to one aspect of the present invention, the rotor is provided with radially disposed coils or windings or with longitudinally disposed coils having radially oriented pole pieces while another aspect of the present invention relates to the use of a particular continuous "S" shaped winding.

An additional aspect of the present invention resides in the use of horse-shoe shaped flux channelling members which frame each of the ends of the individual coil portions of the S-shaped winding and which channel the magnetic flux from or toward the coil portions into narrow paths which are designed to interact with the magnetic fields associated with the corresponding stator members.

Other objects, advantages and applications of the present invention will be made apparent by the following detailed description of examples of embodiments of the invention, with reference to the accompanying drawings wherein like reference numerals refer to like or equivalent elements and in which:

Detailed description of the preferred embodiments

Figure 8:
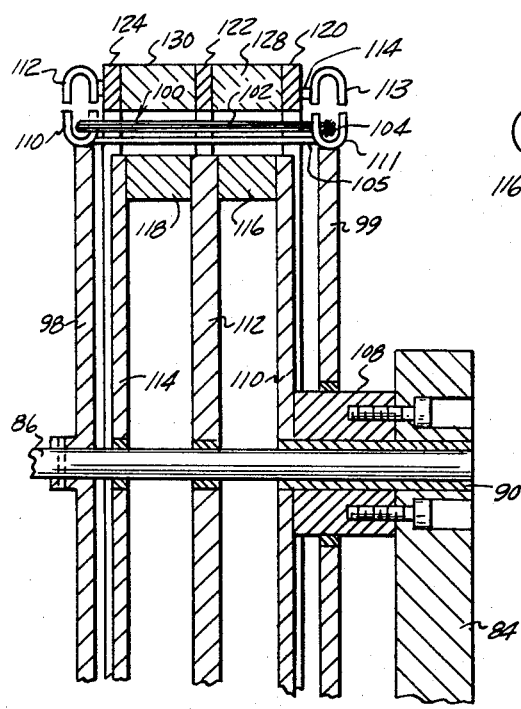
FIG. 8 is a schematic partial longitudinal modification of the invention providing for magnetic flux channelling members for use with the S-wound rotor coils.

The electrical motors and generators disclosed in the specification and drawings were built for experimental purposes to reduce the invention to practice and may not represent the best commercial form thereof. Therefore, while representing preferred embodiments, the physical arrangement and constuction details are given for illustrative purposes only of the principles of the invention as defined in the appended claims.

Referring to the drawings, an electric machine according to the invention and as shown in FIGS. 1 through 4 comprises a horizontal base or frame 10 which carries a pair of upright vertical end plates 12 and 14.

The base 10 and the end plates 12 and 14 may be formed of metal or other material providing the necessary rigidity. The end plates 12 and 14 support a pair of sleeve bearings 16 and 18 in which is journalled a rotatable shaft 20. The shaft may extend beyond the plates 12 or 14 at either end so as to be coupled to a driving or driven member according to whether the electric machine is a generator or a motor.

A pair of identical commutator disks 22 and 24 are fixed to the shaft 20 adjacent the end plate 14. The commutator disks are formed of a rigid insulating material. At their outer edges they support a plurality of conductive commutator strips 26. The strips 26 are arcuate in shape and are separated by thin insulating segments 28 which may be formed integrally with the disks 22 and 24. The outer surfaces of the conductive segments 26 and insulating segments 28 are flush with one another so as to form a continuous cylindrical surface.

A pair of brushes 30 and 32 formed of identical bent strips of spring metal have against the outer edges of the commutator disks 22 and 24 respectively. The brushes 30 and 32 have their lower ends attached to insulating support blocks 34 and 36 which are fixed to the base member 10. The brushes have bent sections 38 at their ends which abut the outer surfaces of the commutator disks 22 and 24. These bent sections make contact with the conductive segments 26 as the commutator disks rotate in unison with the shaft 20.

A source of direct current electrical power may be connected across the brushes by means of terminals 33 and 35 in the motor version of the electrical machine of the invention, while terminals 33 and 35 are connected across a utilization circuit in the generator version thereof.

Figure 2:
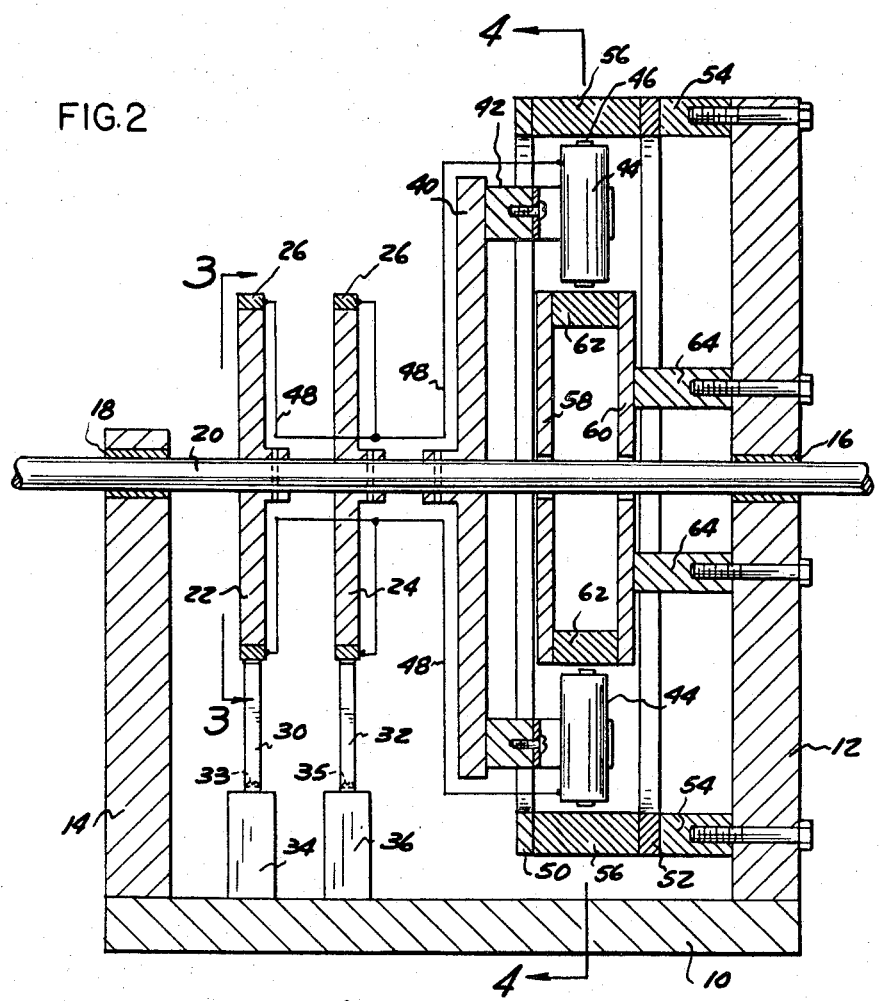
FIG. 2 is a longitudinal sectional view of the electric machine of FIG. 1.
Figure 3:
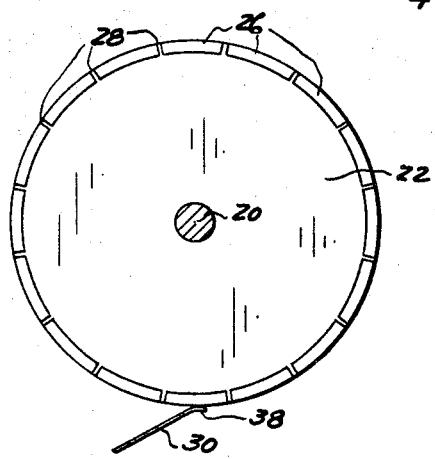
FIG. 3 is a view from line 3—3 of FIG. 2 showing an end view of a commutator disk.

As best seen in FIG. 2, the shaft 20 also carries a rotor disk 40 which is larger in diameter than the commutator disks 22 and 24 and is carried by the shaft between the commutator disks and the end plate 12. The rotor disk 40 has an annular ring 42 adjacent to its perimeter and affixed to the surface of the disk which faces the end plate 40. A plurality of rotor electromagnets 44 are attached to the ring 42 at regular intervals about its perimeter. The electromagnets 44 each have a central metal core 46 and the cores are aligned radially with respect to the shaft 20. Each of the electromagnets 44 is wound with a single electrical coil and the coils are individually connected across the conductive commutator segments 26 by wires 48. A schematic of the commutation connections is disclosed in FIG. 7 and will be described subsequently.

The electric machine of the invention has an outer stator and an inner stator, both supported with respect to the end plate 12. The outer stator is defined by an outer diameter member formed of two longitudinally spaced annular rings 50 and 52. The ring 52 is supported off the end plate 12 by a pair of spacer blocks 54. The rings 50 and 52 are of equal diameter and are arranged about the axis formed by the shaft 20. The two rings 50 and 52 are connected by a plurality of rectangular permanent magnets 56 arranged in two circular rows at equal intervals between spaced rings 50 and 52. The number of magnets in a row is equal to the number of rotor electromagnets 44. The inner stator ring is formed by a pair of disks 58 and 60 which surround the shaft 20 but do not contact it and are joined by a plurality of permanent magnets 62 which are disposed in two circular rows in radial opposition to the permanent magnets 56 forming the outer stator. The disk 60 is supported off the end plate 12 by a pair of blocks 64.

The operation of the electric machine of the invention will now be described relatively to its function in a motor mode.

Figure 4:
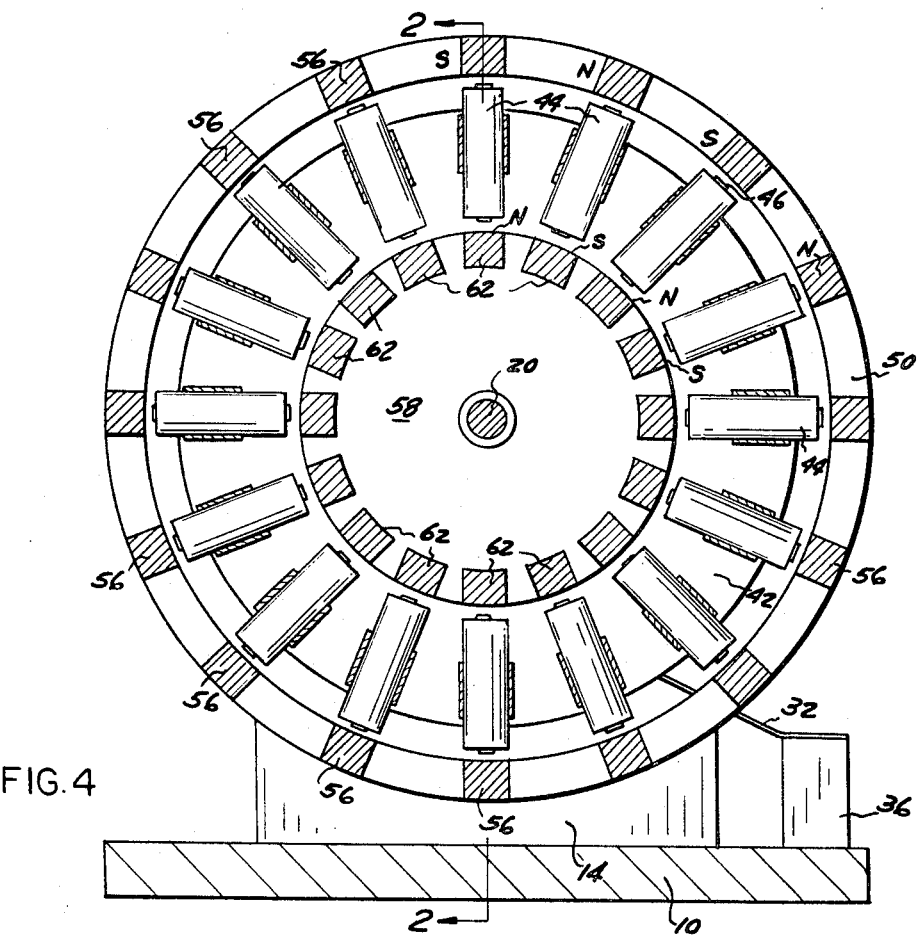
FIG. 4 is a sectional view through the rotor and stators of the electric machine of FIG. 1 taken along line 4—4 of FIG. 2.

As one of the electromagnets 44 of the rotor is energized, its magnetic field interacts with the magnetic fields of a pair of adjacent permanent magnets 56 and 62. The brushes 30 and 32 are connected to a direct current source and supply this direct current to the commutator segments 26. The commutator segments are so connected to the electromagnets 44 that the magnetic poles of any one of the electromagnets are similar to the adjoining poles of the nearest adjacent permanent magnets 56 and 62. For example, the polarities of the ends of the permanent magnets 56 and 62 nearest the rotor member are indicated in FIG. 4. It will be noted that the permanent magnets forming one of the stators alternate in polarity with a north pole disposed next to a south pole. Furthermore, the stator permanent magnets are oriented so that a north pole of a magnet 56 of the outer stator faces the south pole of the radially opposite magnet 62 of the inner stator and vice versa. Therefore, as one of the electromagnets 44 is positioned between a pair of magnets 56 and 62, one of which is in the outer stator and the other in the inner stator, the two ends of the rotor electromagnet core 62 face magnets of opposite polarities. The connections between the commutator 26 and the coils of electromagnets 44 are such that when an electromagnet 44 is disposed between a pair of permanent magnets 56 and 67, its end polarities are similar to those of the adjacent permanent magnets. That is, a south pole of the rotor electromagnet faces a south pole of the adjacent stator permanent magnet. This causes a force of repulsion between the rotor electromagnet and the stator permanent magnet. The direction of this force is dependent upon the initial direction of rotation of the rotor and may be controlled by appropriate angular positioning of the brushes 30–32 with respect to the angular position of the appropriate commutator segments 26.

At the time that an electromagnet 44 is in radial alignment with two permanent magnets that generate a repulsive force against the rotor, the polarity of the next adjacent set of permanent magnets is such as to attract the electromagnet. Thus, this combination of repulsive and attractive forces cause a rotational movement of the rotor. As a particular electromagnet approaches the next pair of permanent magnets, the commutator switches the current to reverse the magnetic polarity of the electromagnet and to generate another set of repulsive and attractive forces with the next set of permanent magnets.

Figure 7:
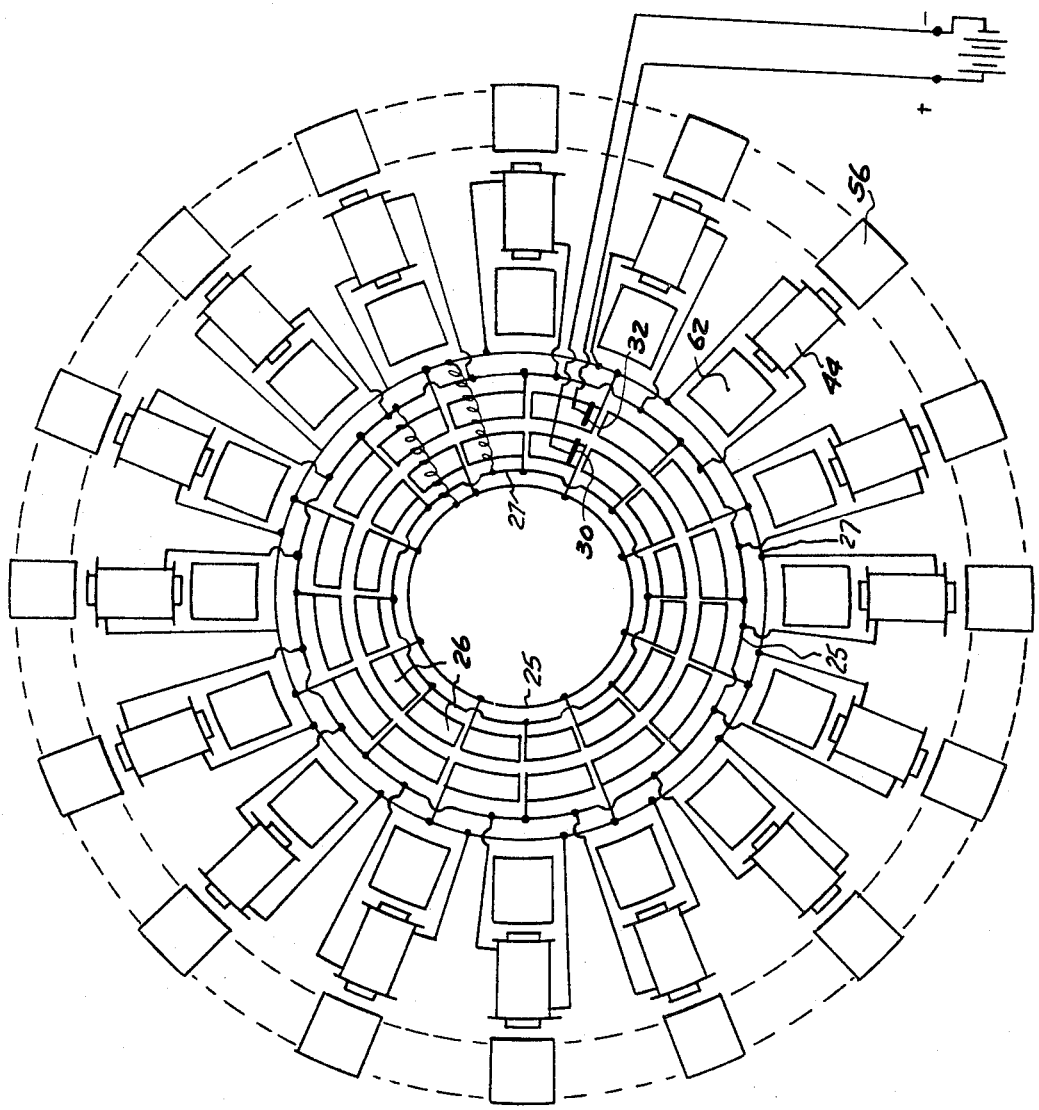
FIG. 7 is a wiring diagram illustrating the connections between the commutator of the electric machine of FIG. 1 and the rotor coils thereof.

As seen in FIG. 7, the number of commutator segments 26 is equal to the number of electromagnets 44 in the rotor. The commutator segments on both commutator disks 22 and 24 are connected in two sets. Starting at any point on the commutator and numbering the segments in either direction, all of the even segments are joined together by one common line 25 while all the odd segments are connected together by another common line 27. Each of the electromagnets 44 has its two ends connected across these two lines with adjacent electromagnets connected across the lines in an opposite direction so as to produce a current flow in an opposite sense. In this manner, the two commutator connections on the commutator disks 22 are connected to the two connections of the commutator disk 24 such that the adjacent segments on the two disks are connected to different common lines. Since the brushes 30 and 32 bear against a pair of adjacent disks, they energize all of the electromagnets 44 so that opposite magnetic poles are produced in adjacent electromagnets. When the commutator rotates sufficiently so as to produce a current flow through the next adjacent set of commutator segments, these magnetic poles on the rotor are reversed, producing the desired motor action.

Figure 5:
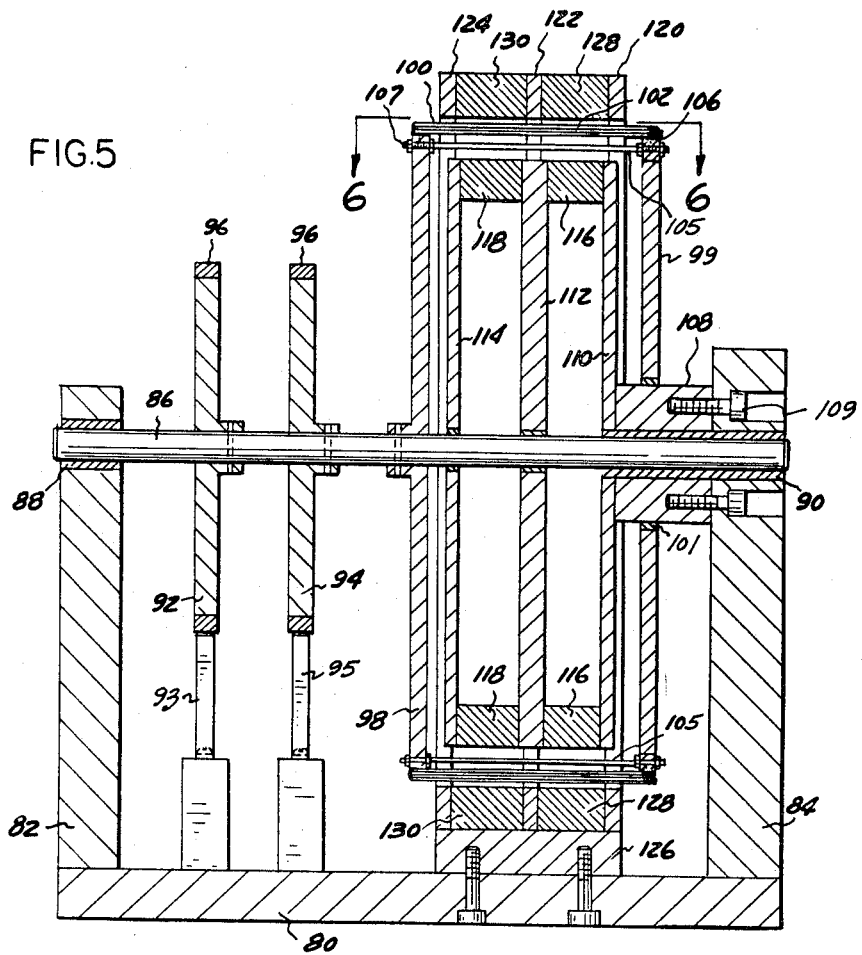
FIG. 5 is a longitudinal sectional view of a modification of the invention which employs an S-wound rotor coil.
Figure 6:
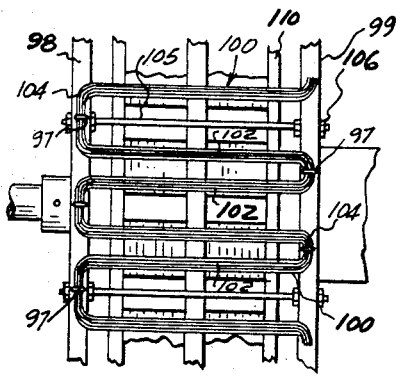
FIG. 6 is a top view of a section of the S-wound rotor coil substantially from line 6—6 of FIG. 5.

FIG. 5 and 6 illustrate a second embodiment of electric machine according to the invention wherein the electromagnets on the rotor are replaced by a continuous skein winding which produces a desired magnetic field when currents are passed through it in a suitable direction when the electric machine is functioning in a motor mode. Referring to FIGS. 5 and 6, the modified electric machine comprises a base plate 80 having two vertically disposed end plates 82 and 84 affixed thereto. A rotor shaft 86 is journalled in a pair of sleeve bearings 88 and 90 disposed in the end plates 82 and 84 respectively. A pair of commutator disks 92 and 94 are attached to the shaft 86 and have a series of conductive commutator segments 96 disposed about their edges in a manner identical to the commutator disks 22 and 24 of the precedently described embodiment, for cooperation with a pair of brushes 93 and 95.

The rotor of the embodiment of FIGS. 5 and 6 is supported by a pair of rotor disks 98 and 99, rotor disk 98 being affixed to the shaft 86 for rotation in unison therewith. On their outer perimeters the rotor disks 98 and 99 supports an S-shaped continuous winding 100 which is best seen in partial top view in FIG. 6 and which is supported on the periphery of the disks by clips 97. The winding 100 is formed as a skein and has a plurality of longitudinal or axial sections 102 which extend parallel to the axis of rotation of the rotor and integral connecting substantially arcuate sections 104 at each end. The two ends of the continuous skein winding 100 are connected to the two common lines of the commutator disks 92–94 having their segments 96 wired in a manner identical to the first described embodiment of the invention. Therefore, as the rotor rotates the current is continually reversed throughout the length of the skein winding 100. Each pair of consecutive straight longitudinal portions 102 of the winding with one of the end sections 104 forms the equivalent of one of the coils 44 of the embodiment of the invention illustrated in FIGS. 1–4. Disks 98 and 99 are held apart by means such as rods 105 provided with appropriate threaded ends 107 cooperating with nuts 106 for clamping and separating the disks. Disk 99 has a bushing 101 adapted to engage for rotation thereabout a stationary hollow cylindrical member 108 mounted on end plate 84 by means such as bolts 109.

The stator comprises an inner and outer portions or inner and outer stators. The inner stator is supported off the end plate 84 by hollow cylindrical member 108. The shaft 86 passes through the center of the hollow cylindrical member 108 which provides additional support for bushing 90. The cylindical member 108 supports a first disk 110 with a central aperture to clear the shaft 86. The disk 110 is connected to another pair of disks 112 and 114 by two circular rows of regularly spaced permanent magnets, 116 and 118.

The outer stator is formed by three rings 120, 122 and 124 which are fixedly supported coaxially to the shaft 86 from the base 80 by a plate 126 and which support two parallel circular rows of permanent magnets 128 and 103. The row of magnets 128 is supported between the disks 120 and 122 and the row of magnets 130 is supported between the disks 122 and 124. The outer stator magnets 128 are aligned one by one with the inner stator magnets 116 and the outer stator magnets 130 are aligned one by one with the inner stator magnets 116 and the outer stator magnets 130 are aligned one by one with the inner stator magnets 118. The magnets polarities are such that the opposed bases of the magnets 128 and 130, and 116 and 118, respectively, are of opposite polarities so that magnetic flux passes between the sets of magnets. Magnets 116 and 118 and magnets 128 and 130 which adjoin one another longitudinally respectively in the inner stator and the outer stator have their poles aligned in the same manner so as to act as one continuous magnet in the respective stators. The flux of these magnets interacts with the flux created by the current which passes through the skein segments 102. The magnetic poles generated by this current are of such polarity as to interact with the permanent magnet magnetic field in much the same manner as described with respect to the first embodiment of the invention so as to create repulsive and attractive forces which causes the rotation of the rotor when the machine is operated as a motor.

Referring now to FIG. 8 which represents a view substantially alike a portion of FIG. 5, but illustrating a very important aspect of the present invention, U-shaped, or horseshoe shaped flux channelling members 110 and 111 are disposed respectively on the periphery of disk 98 and disk 99, and are arrangde to partly surround the arcuate portions 104 of S-shaped skein winding. U-shaped, or horseshoe shaped permanent magnets 112 and 113 are supported by means such as brackets 114 on the outer peripheral surfaces of respectively stator disks 124 and 120. The flux channelling members 110 and 111, in the motor version of the invention, thus channel and concentrate the magnetic flux created at arcuate portions 104 of the S-shaped skein winding, and direct such magnetic flux in such manner as to react with the magnetic flux from each U-shaped permanent magnet 112 or 113 disposed on the outer stator. The result is to create additional forces of attraction and repulsion which cause additional forces increasing the torque applied upon the rotor of the motor, without any additional electrical power absorbed by the skein winding of the rotor. In this manner, the total overall efficiency of the motor, or of the generator when the machine is operated of a generator mode, is substantially increased by utilizing magnetic fields which would effectuate no useful work in more conventional electric machine structures.

Figure 9:
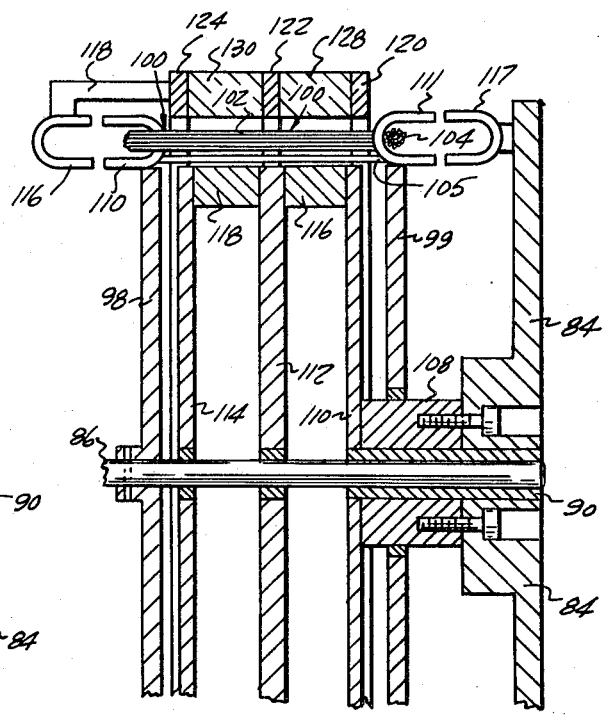
FIG. 9 is a further modification of the arrangement of FIG. 8.
Figure 1:
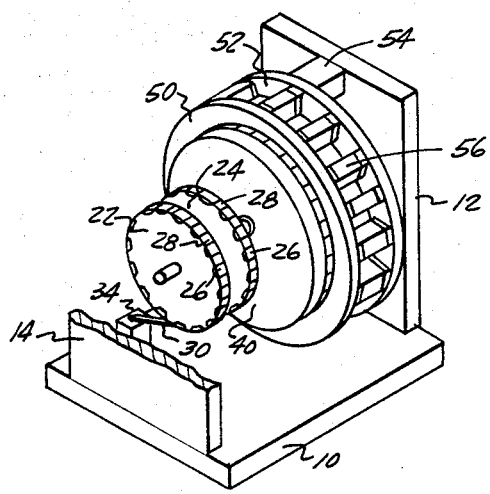
FIG. 1 is a perspective schematic view of an electric machine in accordance with the present invention and having a cylindrical rotor disposed for rotation between a pair of stators.

FIG. 9 represents a modification of the structure of FIG. 8, wherein the U-shaped or horseshoe shaped channelling members 110 and 111 are longitudinally or axially disposed such as to react with permanent magnets, also U-shaped or horseshoe shaped, which are disposed, as shown at 116 and 117, so as present faces adapted to form a magnetic gap with the corresponding faces of the U-shaped or horseshoe shaped flux channelling members 110 and 111. In the drawing, U-shaped permanent magnets 116 are shown mounted from the outer stator of the machine by means of support brackets 118, while U-shaped or horseshoe shaped permanent magnets 117 are shown supported from the machine end plate 84. It is evident that the structure adapted for supporting the U-shaped or horseshoe shaped permanent magnets is a matter of choice and structural convenience as long as such magnets are disposed in such a manner that their end pole pieces are in close proximity with the end pole pieces of the flux channelling members 110 and 111. All the horseshoe permanent magnets in a row are alternately inverted from one to the next in a row such as to present successively pole pieces of alternate polarity to the end pole pieces of the rotor flux channelling members because, when the rotor rotates, the commutation of the skein winding 100 is such as to periodically reverse the current circulating therethrough as many times as there are opposed pair of permanent magnets in the outer and inner stators, as previously explained in detail. Consequently, the U-shaped or horseshoe shaped permanent magnets of the auxiliary stator are disposed so as to present pole pieces of appropriate polarity to create adequate attractive and repulsive forces relatively to the flux channelling members 110 and 111 mounted on the rotor.

Figure 10:
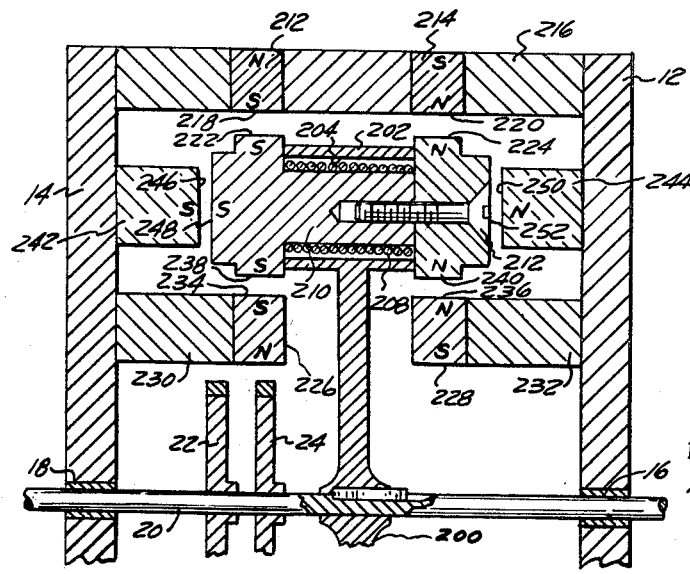
FIG. 10 is a schematic partial longitudinal view of a further modification of the invention.

FIG. 10 schematically represents a further modification of the present invention, shown in longitudinal section and having substantial analogy with the embodiment hereinbefore disclosed at FIGS. 1–4. On the motor shaft is keyed a rotor disk 200 for rotation in unison therewith, the rotor disk 200 having a shouldered enlarged peripheral portion 202 provided with a plurality of longitudinal disposed pockets or apertures 204 in each of which is placed an electromagnet 206. Each electromagnet 206 constitutes a winding 208 on a longitudinally or axially disposed magnetically permeable core 210, made in two pieces, as shown, which are assembled together by means of a screw 212 for ease of assembly. Each magnetic core 210 forms end pole pieces adapted to cooperate and form repulsive and attractive magnetic forces with diverse permanent magnets forming an inner stator, an outer stator and an end stator on each end of the machine. As illustrated, the outer stator consists of permanent magnets 212 and 214 disposed in the housing 216 between end plates 12 and 14 and having, respectively, pole pieces 218 and 220 arranged to form magnetic gaps with faces 222 and 224, respectively, of rotor coil core 210. The inner stator is made of a plurality of permanent magnets 226 and 228 supported respectively by annular rings 230 and 232 supported in turn by end plates 14 and 12. The magnets 226 and 228 have pole pieces 234 and 236 adapted to cooperate with faces 238 and 240 of the rotor coil cores 210.

The end rotors consist of a first row of permanent magnets 242 mounted on the inner face of end plate 14, and a second row of permanent magnets 244 mounted upon the inner face of end plate 12. Each magnet 242 has a pole face 246 adapted to cooperate with end face 248 of each rotor coil core 210, while each magnet 244 has a pole face 250 adapted to cooperate with end face 252 of the rotor coil core. Therefore, each electromagnet 206 of the rotor is placed in contiguous relation with six permanent magnets of the diverse stators, each time that during the rotation of the rotor, the electromagnet core end pieces are in alignment with the permanent magnets in the stators. The orientation of the diverse permanent magnets in the stators is such that, for example, pole faces 234, 246 and 218 are in a first group of the same polarity, while pole faces 236, 250 and 220 form a second group of a plurality opposed to the polarity of the first permanent magnet group. In this manner, all the pole faces of the permanent magnet corresponding to one end of rotor electromagnet cores 210 are adapted to react with the appropriate pole faces of the rotor electromagnet core end such that appropriate repulsive and attractive forces are exerted by the permanent magnets placed at regular intervals in the inner, outer and end stators.

It can thus be seen that the structural arrangement of FIG. 10, provided with electrical interconnection between the diverse rotor electromagnet coils as previously explained with respect to the embodiment of FIGS. 1–4 and FIG. 7, provides for very efficient utilization of the inter-reacting magnetic fields between the rotor and the diverse stators in the motor mode of the invention, and provides for intense magnetic field variations during the rotation of the rotor from one angular position to the next resulting in a very efficient manner for intensely inducing electrical voltage in the rotor windings in the generator form of the invention.

While the diverse embodiments and modifications of the invention have been disclosed and described as operating on direct current or generating direct current, it will be obvious to those skilled in the art that the principles of the present invention present considerable usefulness in alternating current electrical machines. The commutation herein disclosed is adapted to periodically reverse the direction of the current circulating through the rotor windings when operating in direct current. Consequently, the commutation may be modified so as to consist of continuous current conductive rings directly connected across an alternating current source, to operate the electric machine in a motor mode, or connected to a utilization circuit to which alternating current is supplied, in the generator mode of the invention.

While it is apparent that the disclosed embodiments of the invention are well calculated to fulfill the objects of the invention, it will be appreciated that the invention is susceptible of modifications, variation and change without departing from the proper scope or fair meaning of the appended claims.

What is claimed as new is:

1. A direct current electric machine comprising:
a frame having end plates;
a rotatable shaft journalled in said end plates;
a rotor adapted for rotation in unison with said shaft, said rotor comprising a disk mounted on said shaft for rotation therewith;
a plurality of electrical windings peripherally supported by said disk each having a substantially radially disposed magnetic field axis;
a coaxial inner stator ring affixed to one of the end plates;
a plurality of permanent magnets mounted on said inner stator ring with radially directed magnetic field axes, the direction of the magnetic field of each magnet being opposite to the direction of the magnetic fields of the magnets contiguous therewith;
a coaxial outer stator ring affixed to said one of the end plates;
a plurality of permanent magnets mounted on said outer stator ring with radially disposed magnetic field axes, the direction of the magnetic field of each magnet being opposite to the direction of the magnetic fields of the magnets contiguous thereto;
each of the magnets of the outer stator being radially aligned with each of the magnets of the inner stator and forming therewith a magnetic gap and the total number of such pairs of magnets being equal to the number of individual electrical windings of the rotor;
commutating means comprising a pair of commutation rings affixed to said shaft for rotation therewith and each having a plurality of brush engaging segments, the number of segments in one commutation ring being equal to the number of segments in the other ring and to the number of said pairs of pole pieces;
a first common line electrically connected to a first group of alternate segments of both commutation rings and a second common line electrically connected to a second group of alternate segments of both commutation rings;
means electrically connecting said electrical winding across said common lines such that the direction of electrical current flowing in each of said electrical windings is opposite to the direction of electrical current flowing in the electrical windings contiguous thereto and is periodically reversed during passage through each magnetic gap; and
a pair of brushes, one of which is adapted to engage one of the segments of said first group whilst the other engages one of the segments of said second group.

2. The electric machine of claim 1 wherein:
said electrical windings comprise a plurality of individual coils each wound around a radially disposed magnetically permeable core rod;
said individual coils are electrically interconnected in parallel and in alternate directions across said first and second common lines; and
each said magnetic gap formed by each magnet in the outer stator with each magnet in the inner stator is formed by pole pieces of opposite polarities.

3. The electric machine of claim 1 wherein:
said electric windings comprise a continuous S-shaped skein winding defining a plurality of individual winding elements each comprising a pair of substantially parallel straight axially directed sections connected by a first integral substantially arcuate end portion, the individual elements being connected to each other in series by way of a second integral arcuate portion; and
an end of said skein winding is electrically connected to said first common line and the other end of said skein winding is electrically connected to said second common line.

4. The electric machine of claim 1 wherein:
said electrical windings comprise a plurality of individual coils each wound around an axially disposed magnetically permeable core;
said core has ends forming a pair of radially disposed pole pieces, one of said pole pieces being inwardly oriented to cooperate with the permanent magnets of said inner stator and the other of said pole pieces being outwardly oriented to cooperate with the permanent magnets of said outer stator;
each said magnetic gap formed by each magnet in the outer stator with each corresponding magnet in the inner stator is formed by pole pieces of the same polarity;
said individual coils are electrically interconnected in parallel and in alternate directions across said first and second common lines.

5. The electric machine of claim 4 further comprising:
an axially oriented pole piece on each end of said core; and a pair of end stators, each attached to one of said end plates and comprising a plurality of permanent magnets adapted to cooperate with said axially oriented pole piece.

6. The electric machine of claim 3 further comprising:
horseshoe shaped flux channelling means radially oriented and disposed about said skein winding at said arcuate end portions thereof; and
radially disposed horseshoe shaped permanent magnets having pole pieces of opposite polarities and forming part of one of said stators for reacting with said flux channelling means.

7. The electric machine of claim 3 further comprising: horseshoe shaped flux channelling means axially oriented and disposed about said skein winding at said arcuate end portions thereof; and
axially disposed horseshoe shaped magnets having pole pieces of opposite polarities forming end stators for reacting with said flux channelling means.

References Cited

UNITED STATES PATENTS

| | | | |
|---|---|---|---|
| 616,035 | 12/1898 | Thoma | 310—46 |
| 1,996,023 | 3/1935 | MacLachlan | 310—46 |

MILTON O. HIRSHFIELD, *Primary Examiner.*

L. L. SMITH, *Assistant Examiner.*